United States Patent
Fortier et al.

[15] 3,670,284
[45] June 13, 1972

[54] RANGE LIMITER FOR A THERMOSTAT

[72] Inventors: Jean R. Fortier, South Orange; Donald P. Wrobel, Allendale, both of N.J.

[73] Assignee: Federal Pacific Electric Company, Newark, N.J.

[22] Filed: March 3, 1971

[21] Appl. No.: 120,669

[52] U.S. Cl. ............................ 337/360, 116/133, 337/380
[51] Int. Cl. ............................ H01h 37/04, H01h 37/18
[58] Field of Search .................... 78/363.5; 74/526, 553; 116/133; 200/38 R, 153 LB; 337/304, 305, 323, 360, 361, 366, 377, 380, 392

[56] References Cited

UNITED STATES PATENTS

| | | | |
|---|---|---|---|
| 3,463,008 | 8/1969 | Teichert et al. | 337/380 UX |
| 3,358,101 | 12/1967 | Bletz | 337/361 X |
| 2,671,148 | 3/1954 | Schulenburg | 200/153 LB |
| 3,183,719 | 5/1965 | Norman et al. | 73/363.5 X |

*Primary Examiner*—Bernard A. Gilheany
*Assistant Examiner*—Dewitt M. Morgan
*Attorney*—Paul S. Martin

[57] ABSTRACT

A thermostat is described having a bimetal that actuates a snap-switch for maintaining the temperature of the room at approximately a given set-point. A knob operates a cam for controlling the resting position of the bimetal to determine the temperature set-point. The knob has a series of radial fingers which can be broken away individually, and the stationary structure of the thermostat has a fixed lug that can be bent up into the path of the knob fingers. Certain fingers of the knob are broken away and the lug is bent into the space left free of fingers. The remaining fingers limit the rotation of the knob and thus limit the range of adjustment.

6 Claims, 3 Drawing Figures

PATENTED JUN 13 1972

3,670,284

RANGE LIMITER FOR A THERMOSTAT

The present application relates to thermostats, especially thermostats for room-temperature control.

In the normal operation of a thermostat, the operating set-point is manually established by adjusting a control knob to a desired temperature. The heating apparatus of the room will deliver heat when the temperature drops below the set temperature and the heat will be cut off when the temperature reaches or exceeds the set temperature of the thermostat. The occupant of the room adjusts the thermostat knob to establish different set-points. Poorly informed people are tempted to adjust the thermostat incorrectly. Thus, if the room temperature is below the desired temperature, an occupant may adjust the knob to a grossly excessive temperature setting, hoping that the room temperature will rise faster. The room temperature rises to the desired temperature and then the temperature rises well above the desired level. Then the occupant (if present) must adjust the thermostat to a lower setting. Once the room temperature is higher than desired, the temptation exists for the occupant to adjust the thermostat well below the desired temperature with the thought that such adjustment will cause the temperature to drop faster. Under such a too-low thermostat setting, the heater does not turn on until the room temperature drops to the actual excessively low setting. Once again the occupant is unhappily exposed to an uncomfortable temperature.

In an effort to contend with this problem, thermostats often have range-limiting devices. Either a high-limit stop has been provided or a low-limit stop has been provided, and in some instances both high and low stops or range limiters have been provided. The arrangements are usually complicated and add significant cost. When a range limiter is provided, the adjustment is restricted to a modest latitude so that, even where an inexpert user is involved, the extent of misadjustment is limited. Accordingly, the consequences of improper adjustment are minimized. Range limiters are particularly valuable (for example) in motels, because it is not practical to indoctrinate each new guest into the proper use of his room thermostat.

An object of the present invention resides in providing thermostats with a novel form of range limiter. In carrying out the invention, the illustrative embodiment which is described in detail below involves a knob which has a series of radially projecting teeth or fingers distributed about its circumference. A stationary part of the thermostat provides a lug that may be bent into a position that would obstruct the travel of the teeth. The range limiter of the described thermostat is made effective by bending the lug up while the knob is removed from the thermostat, certain of the projecting teeth of the knob are broken away, and the knob is again mounted on the thermostat. The range of adjustment of the knob is limited by the broken-away teeth, inasmuch as the upstanding lug becomes a stop that prevents rotation of the knob beyond the range of the broken-away teeth, thereby providing upper and lower limits.

The nature of the invention and its various features and advantages will be more fully appreciated from the following detailed description of the illustrative embodiment which is shown in the accompanying drawings. In the drawings.

Figure 1:
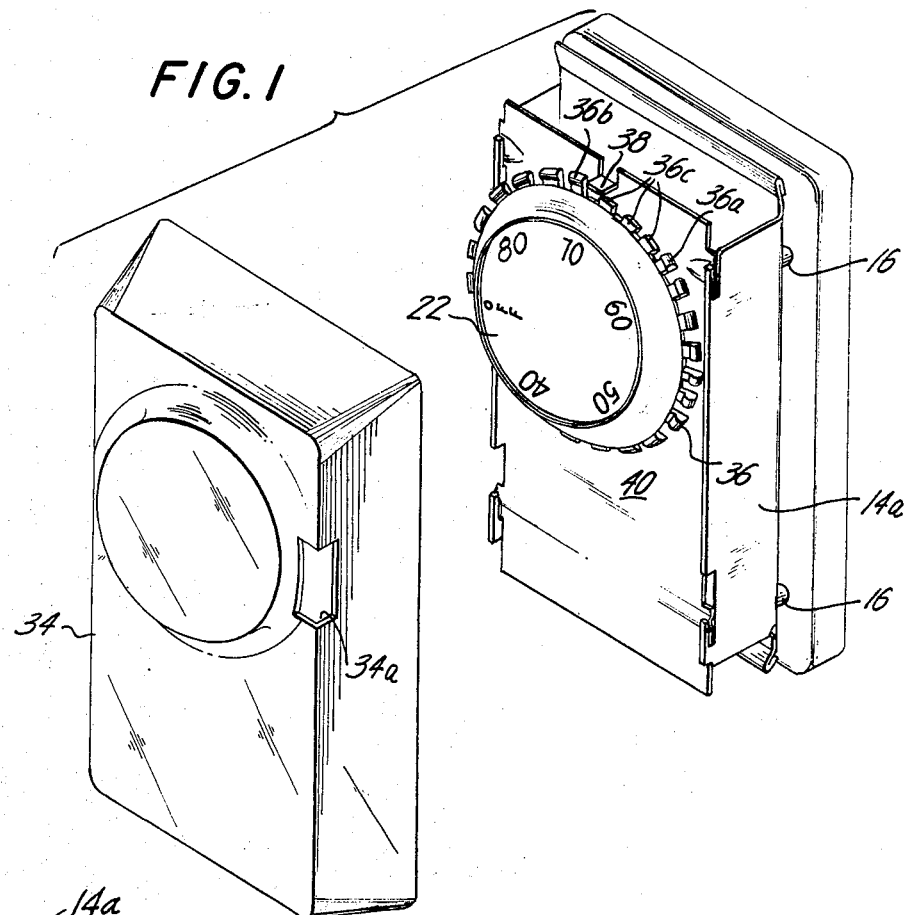
FIG. 1 is a perspective view of a thermostat with a semitransparent cover removed and shown in exploded perspective position.
Figure 2:
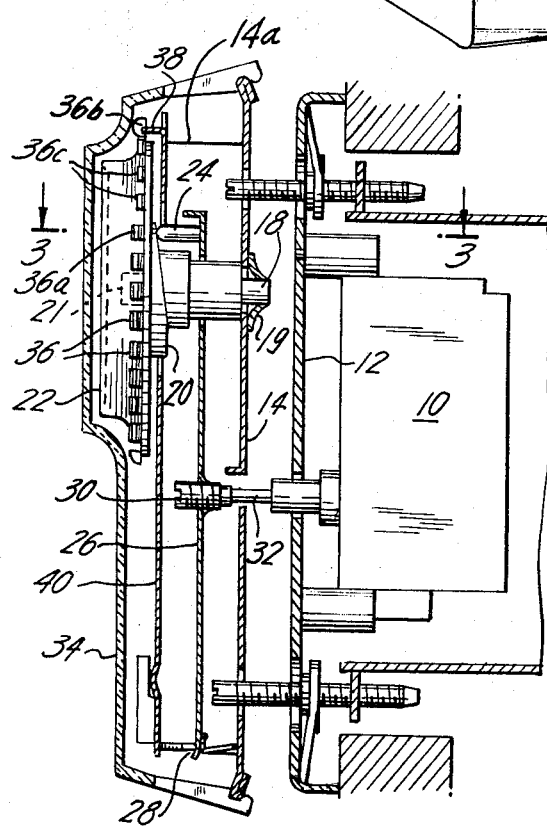
FIG. 2 is a vertical cross-section of the thermostat in FIG. 1 with the semi-transparent cover in its assembled position.
Figure 3:
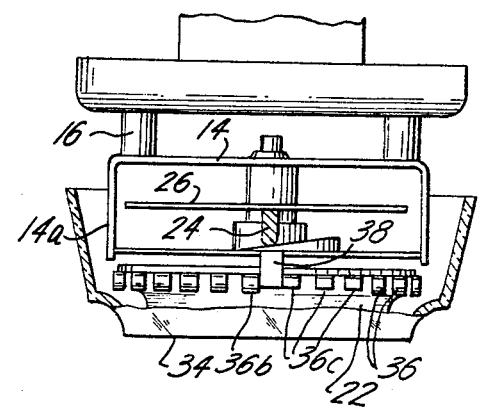
FIG. 3 is a top plan view of the thermostat of FIG. 2, the cover being shown in cross-section.

The illustrative thermostat of the drawings is of the same internal construction as that in copending application Ser. No. 83,992 entitled "Thermostat with Stable Bimetal Support" filed Nov. 6, 1970. This thermostat includes a snap-switch 10 mounted on the back of a mounting plate 12. A secondary or baffle plate 14 is mounted on four bushings 16 of insulation (FIGS. 1 & 3). Plate 14 provides a bearing for cam shaft 18. A sharp-edged washer 19 bites into shaft 18 and holds a shouldered portion of the shaft against plate 14. Shaft 18 carries cam 20 and a removable knob 22 is mounted on the front of the cam structure. For this purpose a generally cylindrical shaft 21 having a locating flat lateral face is received in a like cavity in the knob, frictionally retained by a leaf-spring (not shown). A cam follower 24 is fixed rigidly to the upper end portion of bimetal sheet (or "bimetal") 26, and bimetal 26 has a hinge 28 at its lower extremity. An adjustment screw 30 in bimetal 26 bears against rod 32 that is slideable in switch 10 for operating the internal switch mechanism. A conventional snap-switch is used, having two stable conditions. The switch goes from one condition to another ("open" or "closed" usually) in dependence on the pressure against rod 32. A translucent cover 34 is held in position on the upper and lower edges on plate 14, for decorative and protective purposes. A lateral slot 34a provides access for a person's fingers to manipulate knob 22.

A series of break-away teeth or fingers 36 project radially from the periphery of knob 22. Knob 22 is made of a frangible material, any of a wide variety of plastics being suitable for this purpose, so that fingers 36 are easily broken off for establishing the desired range limits. A cover plate 40 is mounted on the lateral walls 14a of plate 14. As here shown, three of the teeth 36 are broken away and leave stubs 36c, bounded by teeth 36a and 36b. A lug 38 is normally in the plane of plate 40, out of the path of teeth 36. When range limits are to be established, the lug is thus disposed in the path of teeth 36. One or more of the teeth 36 must be broken away to provide space for receiving bent-up lug 38 and then the knob is mounted as shown. With the teeth broken away as illustrated and with the dial legend represented on knob 22 in FIG. 1, the range of motion of the knob is limited to the region between approximately 62° and 70° F. By breaking away additional teeth 36, a wider range can be established. Lug 38 is so located in relation to cam 20 and in relation to the temperature calibration numerals on the knob, that the teeth broken away between the temperatures represented on the knob will establish a corresponding adjustment range.

Cover 34 is normally in place over the knob. The cover itself being only translucent, it is difficult to notice the range-limiting provision that has just been described. The range limiting feature would be by-passed by removing the cover and removing the knob or by bending lug 38 out of the path of the teeth 36. However, this normally would not be done by the occupant of the room. Consequently, the temperature adjustment that can be put into effect by normal manipulation of knob 22 through opening 34a in the cover is limited by the positions of those teeth 36a and 36b which remain after other teeth have been broken away to allow space for upstanding lug 38. Lug 38 is located a sufficient distance from slot 34a so that intact fingers 36 are present at opening 34a for all customary latitudes of limited range as represented by broken-away teeth and for all adjusted positions of such limited range.

The room whose temperature is controlled by the thermostat as shown will have a set-point of 70° F as a maximum, and a set-point of approximately 62° F minimum. When the occupant of the room wants the room to heat up, he can only move the thermostat to the 70° F position. The room will heat as fast with that setting as it would if the thermostat knob were moved to 90° F or any other excessively high setting. Correspondingly, if the room temperature is to be reduced (in case it is too hot) the occupant would manipulate the knob to a lower setting; and in this instance it could not be moved below a 62° F setting. The room would not be supplied by heat so long as the temperature is above the set-point. Consequently, the temperature of the room would drop as quickly where the room heater is controlled by the range-limited thermostat described as it would if there were no lower limit to the knob setting.

It will be apparent that a wide variety of changes in the illustrative thermostat can be made by those skilled in the art for carrying out the purposes of the invention as described above. Consequently, the invention should be construed broadly in accordance with its full spirit and scope.

We claim:
1. A thermostat having an ambient temperature responsive element, a switch mechanically coupled to said temperature responsive element for control thereby so as to cause reverse switch operations above and below a temperature setting, and range-limited means for controlling the relationship between the switch and the ambient temperature responsive element to establish a desired temperature setting, the last named means including a manually operable thermostat setting member having a series of teeth operable along a prescribed pathe and readily removable from said path, and said range-limited means including stationary stop means in said path of the teeth to limit the adjustment of the thermostat setting member to a range determined by cooperation of said stop means with teeth operable along said path.

2. A thermostat in accordance with claim 1, wherein said setting member is of a frangible material and wherein said removable teeth are proportioned to be readily broken away from the setting member.

3. A thermostat in accordance with claim 1, further including a fixed sheet-metal part, said stop being in the form of an upstanding lug integral with said sheet-metal part.

4. A thermostat in accordance with claim 1, wherein said thermostat setting member is a knob rotatable about an axis and said teeth are arranged in a circle whose center lies on said axis, said stationary stop being located on said circle.

5. A thermostat in accordance with claim 4 wherein, said teeth project radially from said rotatable knob.

6. A thermostat in accordance with claim 5, further including a cover largely containing said knob and having an access opening adjacent said teeth, said stop means being displaced arcuately sufficiently far from said opening so that intact teeth of the knob are present at said opening throughout the range of adjustment of the knob despite the presence of a range-limiting gap between the teeth of said knob.

* * * * *